United States Patent
Michalek et al.

(10) Patent No.: US 8,670,924 B2
(45) Date of Patent: Mar. 11, 2014

(54) CREATION OF GIS TOOLS AND SPATIAL DATABASE FOR LIMITED ACCESS HIGHWAY ENTRANCE POINTS IN THE US AND CANADA

(75) Inventors: Jeffrey L. Michalek, Shelby Township, MI (US); Mark Gibb, Fenton, MI (US)

(73) Assignee: General Motors LLC, Detroit, MI (US)

( * ) Notice: Subject to any disclaimer, the term of this patent is extended or adjusted under 35 U.S.C. 154(b) by 914 days.

(21) Appl. No.: 12/209,879

(22) Filed: Sep. 12, 2008

(65) Prior Publication Data

US 2010/0070174 A1    Mar. 18, 2010

(51) Int. Cl.
*G01C 21/30* (2006.01)
*G01C 21/32* (2006.01)

(52) U.S. Cl.
USPC .......................................... 701/210; 701/209

(58) Field of Classification Search
USPC .................................. 701/209–210
See application file for complete search history.

(56) References Cited

U.S. PATENT DOCUMENTS 5,515,283 A * 5/1996 Desai et al. .................... 701/200
5,815,161 A * 9/1998 Emmerink et al. ........... 345/440

FOREIGN PATENT DOCUMENTS

| JP | 06137881 A | * | 5/1994 | ............. | G01C 21/00 |
| JP | 09138130 A | * | 5/1997 | ............. | G01C 21/00 |
| JP | 2000339580 A | * | 12/2000 | ............... | G08G 1/00 |

OTHER PUBLICATIONS

JP 2000339580A—Machine Translation.*

* cited by examiner

*Primary Examiner* — Sheetal R Rangrej
(74) *Attorney, Agent, or Firm* — Leydig, Voit & Mayer, Ltd.

(57) ABSTRACT

A navigation assistance system and method determines limited access highway entrance points as destinations in a geographic information system. In one aspect, the limited access highway entrance points are stored as destinations in a geographic database within the geographic information system such that a telematics service provider can provide directions to the limited access highway entrance points.

19 Claims, 4 Drawing Sheets

US 8,670,924 B2

CREATION OF GIS TOOLS AND SPATIAL DATABASE FOR LIMITED ACCESS HIGHWAY ENTRANCE POINTS IN THE US AND CANADA

FIELD OF THE INVENTION

The present invention relates generally to determining location points for a geographic information system, and in particular to a system and method for determining limited access highway entrance points for a geographic information system.

BACKGROUND OF THE INVENTION

As onboard electronic systems become more sophisticated, travelers increasingly turn to computer-aided systems for help with navigation, location, entertainment, and other information services. Although all of these services are useful, the navigation assistance services are perhaps the most widely used services. With respect to navigation services, a telematics unit may provide turn-by-turn directions and other navigation-related services via GPS based chipsets and components to aid the traveler in reaching a specified destination. Route directions may be in the form of verbal directions, displayed directions, or a combination of these media. Directions are typically provided based on geographic data accessed from a geographic information system.

Despite their widespread use and general usefulness, existing navigation assistance systems do not allow the user to specify any point on any road. Rather, due to the manner in which routes are calculated, only certain points are available as destinations or even way points or via points. The presently disclosed principles advance the state of the art in this and other regards.

BRIEF SUMMARY OF THE INVENTION

In the course of receiving navigation assistance, a telematics user may request directions to a limited access highway entrance. For example, a user may have recently rented a vehicle from an airport car rental agency and may thus request directions to a limited access highway entrance point traveling in a particular direction (e.g., I-95 North). Traditional geographic information systems do not provide limited access highway entrance points as destinations. Therefore, telematics service providers cannot deliver directions to the user for this type of destination. Aspects of the invention provide for a system and method to determine limited access highway entrance points as destinations in a geographic information system. Further, the limited access highway entrance points are stored as destinations in a geographic database that is part of a geographic information system such that a telematics service provider can deliver directions (e.g., verbal, turn-by-turn, ANU, etc.) to the telematics user.

Further aspects of the invention include a method for determining limited access highway entrance points for a geographic information system, the method comprises generating a fishbone map that contains intersections points between a plurality of street segments with a plurality of limited access highways using at least one software application. In addition, the method comprises generating limited access highway entrance points using at least one software application to analyze a first set of attributes of the plurality of streets that intersect the plurality of limited access highways within the fishbone map to determine the limited access highway entrance points. Further, the method comprises processing the limited access highway entrance points to store them in a geographic information database as part of the geographic information system.

Another aspect of the invention relates to a system for determining limited access highway entrance points for a geographic information system, the system comprises at least one software application that provides directions to a telematics user for a requested limited access highway entrance point. The system further comprises least one server implements at least one of the software applications, and at least one geographic information database that stores geographic data for a geographic information system and the limited highway access points.

DETAILED DESCRIPTION OF THE INVENTION

Before describing the invention in detail, an exemplary environment in which the invention may operate will be described. It will be appreciated that the described environment is for purposes of illustration only, and does not imply any limitation regarding the use of other environments to practice the invention.

Figure 1:
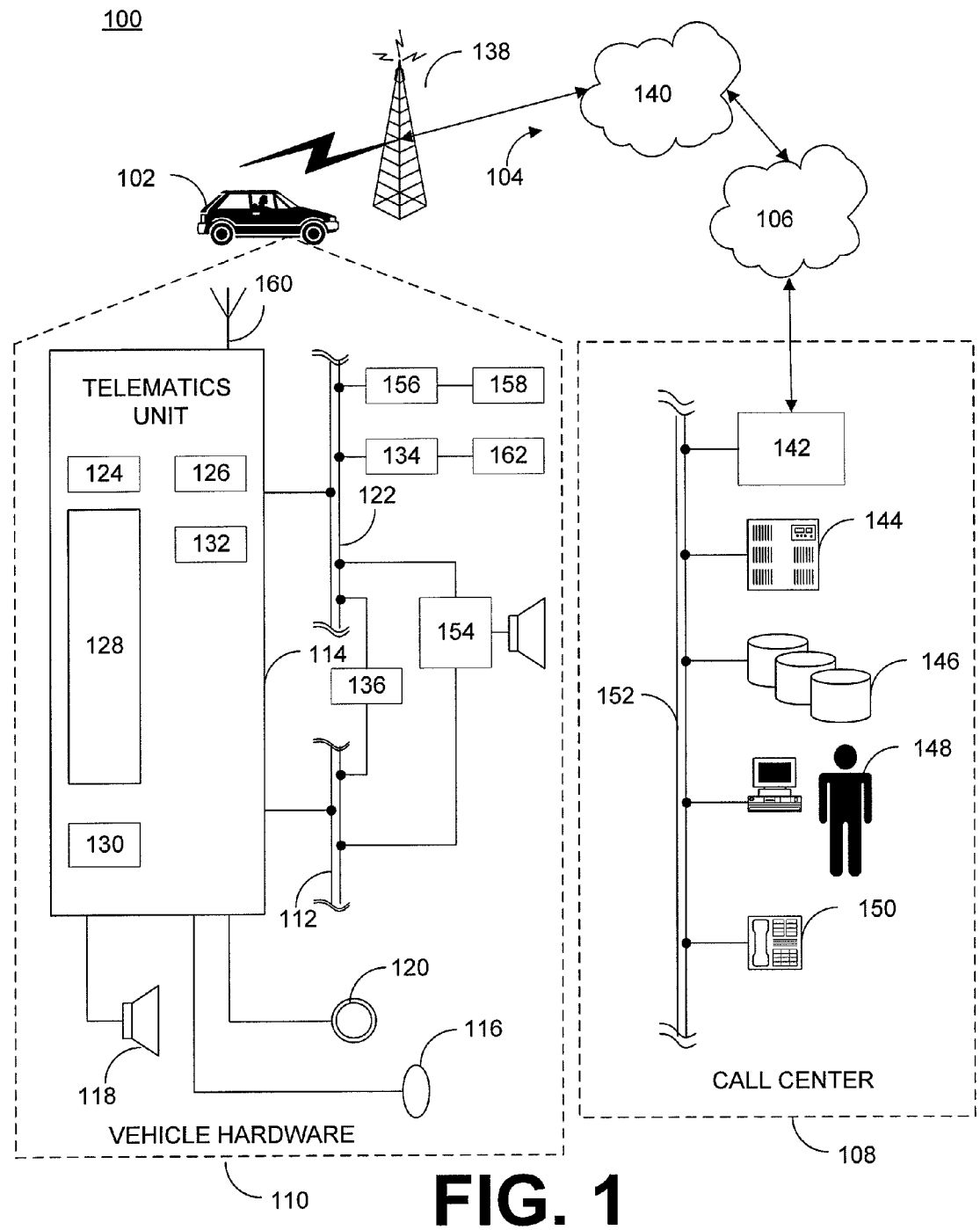
FIG. 1 is a schematic view of an example communication system within which the disclosed system may be implemented.

With reference to FIG. 1 there is shown an example of a communication system 100 that may be used with the present method and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include power train control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server 180. As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing. The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

As noted above, a telematics user may at times desire directions to a limited access highway entrance. For example, a user may have recently rented a vehicle from an airport car rental agency and thus may need directions to a limited access highway entrance point traveling in a particular direction (e.g., I-95 North). Traditional geographic information systems do not provide limited access highway entrance points as destinations. Therefore, telematics service providers cannot deliver directions to the user for this type of destination. In various implementations, the invention provide for a system and method to determine limited access highway entrance points as destinations in a geographic information system. Further, the limited access highway entrance points can be stored as destinations in a geographic database that is part of a geographic information system such that a telematics service provider can deliver directions (e.g., verbal, turn-by-turn, ANU, etc.) to the telematics user.

Figure 2:
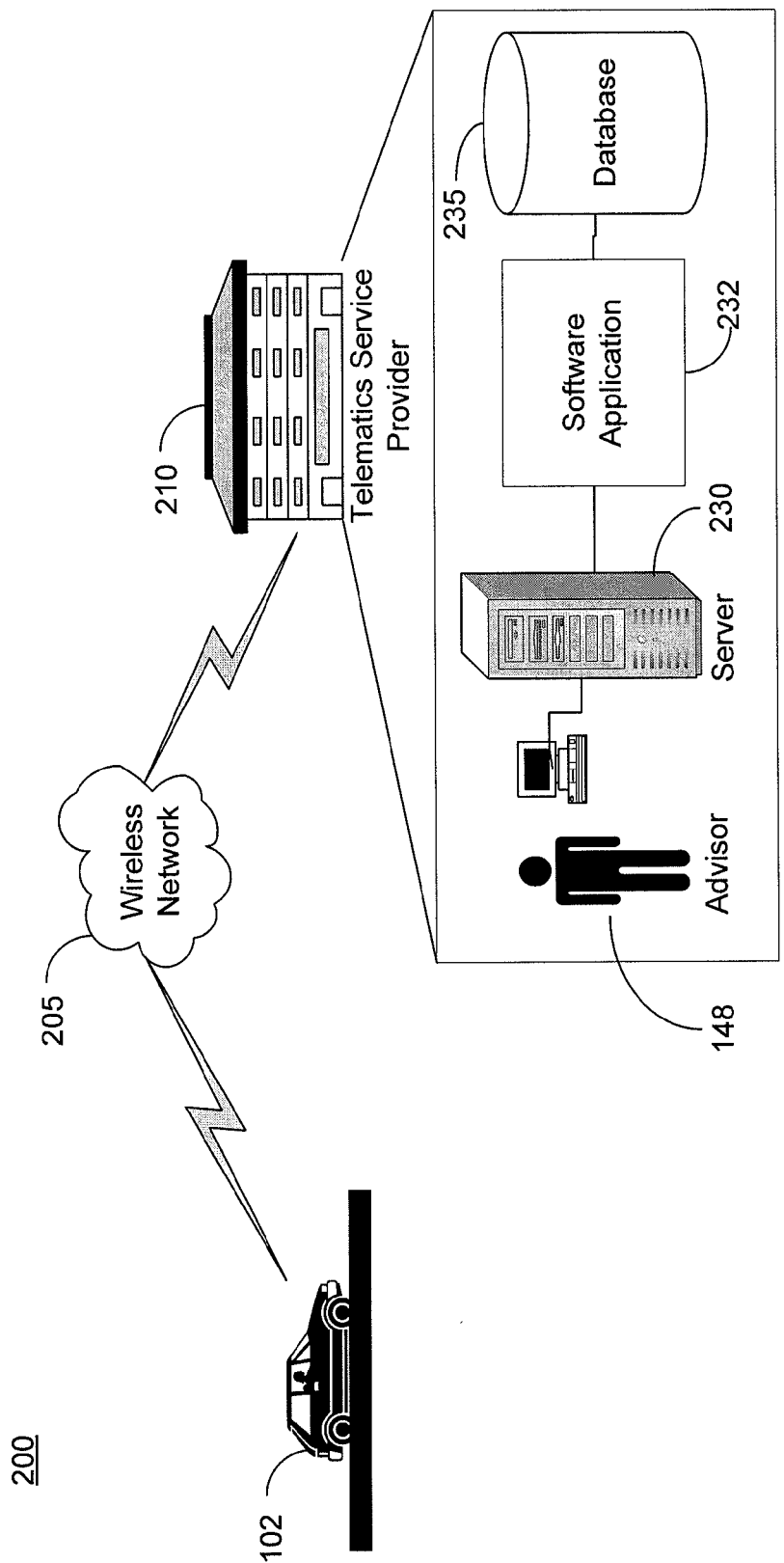
FIG. 2 is a schematic view of an example system architecture in keeping with the disclosed principles.

FIG. 2 is a schematic view of an example system architecture in keeping with the disclosed principles. A telematics user may be a passenger of a vehicle (or driver of a parked vehicle) equipped with a telematics unit 102 such as that illustrated in FIG. 1. The user may request directions 205 to a limited access highway entrance point from the telematics service provider 210 over a wireless communication network. The service provider 210 accesses the directions to the entrance point from a geographic information system (230, 232, and 235). The geographic information system includes a database 235 of geographical data. This data comprises different maps of the U.S. and Canada and other data accessed by at least one software application 232 to provide directions to the user.

A server 230 implements at least one application, e.g., software application 232. The software application 232 may forward the directions to a live advisor through a user interface running on the advisor's computer so that the advisor can provide verbal directions to the user. Alternatively, the provider may forward turn-by-turn directions provided by at least one software application 232 over the wireless communication network 205 to the telematics unit 102. Further, the directions may be downloaded to the telematics unit in the vehicle to update the ANU such that the ANU provides directions to the user.

It will be appreciated that the software applications and other computer-executed activities discussed herein are implemented in the form of computer-executable instructions recorded on a computer-readable medium, wherein the recorded instructions are executed by a computing device such as the telematics unit. Media that are readable by a computer include both tangible and intangible media. Examples of the former include magnetic discs, optical discs, flash memory, RAM, ROM, tapes, cards, etc. Examples of the latter include acoustic signals, electrical signals, AM and FM waves, etc.

Figure 3:
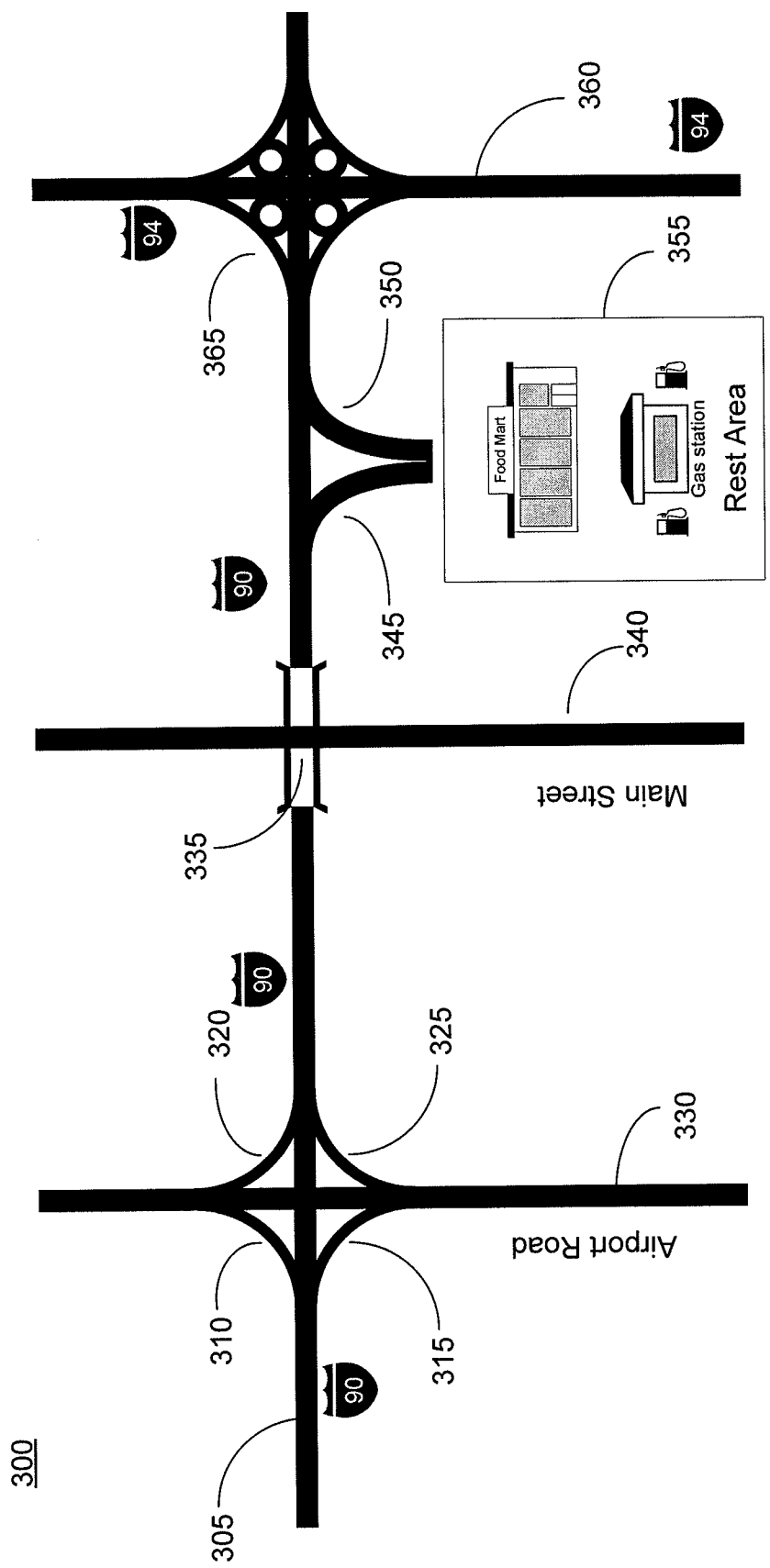
FIG. 3 illustrates an exemplary system and method to determine limited access highway entrance points for a geographic information system.

FIG. 3 illustrates an exemplary system and method to determine highway entrance destinations to be used in a geographic information system (GIS). Using a traditional geographic database with in a GIS, a software application accesses the street map data for all street segments that intersect limited access highways 300 to create a fishbone map. FIG. 3 illustrates an exemplary fishbone map by showing I-90 (305) intersecting several street segments. However, not all intersections of street segments with limited access highways are limited access highway entrance points. Certain apparent intersections on the fishbone map are not intersections at all, but rather street segments that cross a highway via an overpass or underpass.

FIG. 3 shows an example of this type of intersection on a fishbone map. Highway I-90 (305) crosses Main Street 340 via a bridge 335. Other intersections on a fishbone map may be access roads to rest areas along the highway. FIG. 3 illustrates such access roads (345 and 350) to a rest area 355. Further, certain intersections may be highway exits rather than highway entrances. In FIG. 3, off ramps 315 and 320 are exits from I-90 to Airport Road. In addition, other intersections on a fishbone map may be two highways that cross each other such that there is no highway entrance from local roads. In FIG. 3, the off and on ramps from I-90 (305) to I-94 (360) illustrate intersections of two highways that do not provide highway entrances from local roads. Consequently, the exemplary fishbone map in FIG. 3 shows two limited access highways entrance points. These are the limited access highway entrances (310 and 325) onto I-90 (305) from Airport Road 330. Aspects of the invention determine limited access highway entrance points from other intersections of street segments with limited access highways by analyzing the attributes of each road, street, and highway in the GIS database. The details of the analysis of these attributes will be discussed hereinafter with reference to FIG. 4.

Figure 4:
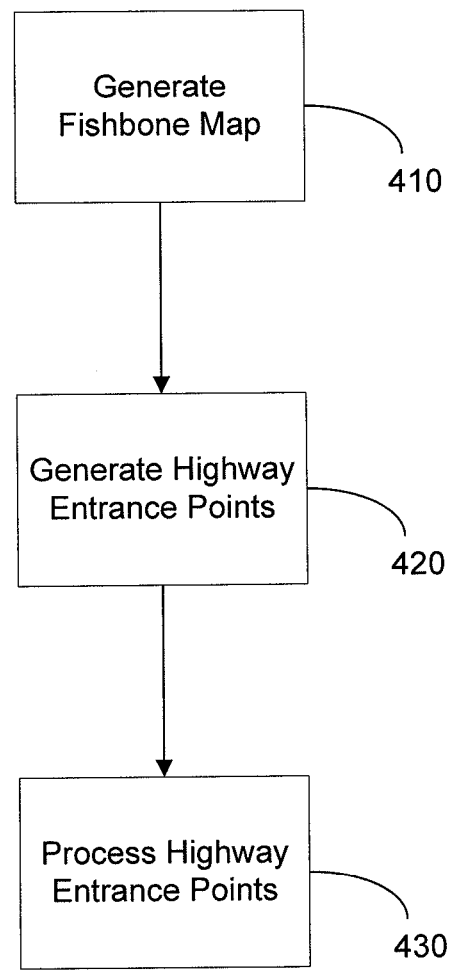
FIG. 4 is a flow diagram that illustrates an exemplary aspect of a method for determining limited access highway entrance points for a geographic information system.

FIG. 4 is a flow diagram that illustrates an exemplary aspect of a method for determining limited access highway entrance points to be used in a geographic information system. At step 410, a software application generates a fishbone map by accessing street map data from a GIS and determining all the street segments that intersect limited access highways. At step 420, a software application generates the limited access highway entrance points from the set of intersections of street segments with limited access highways. The determination of limited access highway entrance point is performed by at least one software application that analyzes a set of attributes given by the GIS to each street segment that intersects a highway. Exemplary attributes may include Street Type, Controlled Access Indicator, Ramp Indicator, and Relative Elevation. Street Type defines the type of road. Examples of types of roads include a highway, residential street, state road, etc.

The Controlled Access Indicator indicates whether the street segment has limited access or not. The Ramp Indicator indicates whether a street segment connects two limited access highways. The Relative Elevation attribute defines the relative elevation of the beginning or ending node on a street segment. Street segments that intersect highways and have the same Relative Elevation value are on the same elevation and may be potentially limited access highway entrance points. However, overpass and underpass intersections would indicate that the Relative Elevation of the node on the street segment and the highway are different and therefore not on the same elevation. Thus, it would indicate that these types of intersections are not limited access highway entrance points.

After determining the limited access highway entrance points, a software application can designate such entrance points as geographic destinations and stores this data into the geographic database of a GIS. At step 430, a software application processes the geographic information of the limited access highway entrance points. This includes applying a set of attributes and other geographic data to the entrance points that includes alternate street names, county, zip code, city, state and province. These attributes and other geographic data are needed for an advisor to search for a requested limited access highway entrance destination when it receives such a request from a telematics user. Further, a software application can user these attributes to search for a limited access highway entrance destination to provide turn-by-turn, ANU, or other types of directions to a telematics user.

It will be appreciated that a new and useful system for navigation assistance has been described. In view of the breadth and wide applicability of the described principles, it will be appreciated that the use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Certain implementations are described herein, including the best mode known to the inventors for carrying out the invention. Variations of those implementations may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A method for determining the geographic locations of limited access highway entrance points for a geographic information system, the method comprising:
   generating a fishhone map that contains intersection points between a plurality of street segments with a plurality of limited access highways;
   identifying intersections between the plurality of street segments and the plurality of limited access highways on the fishbone map, the identified intersections including intersections that do not provide access via one of the plurality of street segments to the plurality of limited access highways;
   identifying limited access highway entrance points by analyzing a first set of attiihutes of the plurality of street segments and the plurality of limited access highways at the identified intersections within the fishbone map to determine the limited access highway entrance points; and
   storing an identification corresponding to the geographic location of a limited access highway entrance point in the geographic information system.

2. The method according to claim 1, further comprising:
   receiving a request from a telematics user for directions to the limited access highway entrance point across a wireless communication network; and
   providing directions to the limited access highway entrance point across the wireless communication network to the telematics user.

3. The method according to claim 2, wherein the directions provided to the telematics user include one of verbal directions, turn-by-turn directions, and autonomous navigation unit directions.

4. The method according to claim 1, wherein storing an identification corresponding to the limited access highway entrance points in the geographic information system further comprises storing the limited highway access entrance points in a geographic information database within the geographic information system.

5. The method according to claim 1, wherein the geographic information system comprises: at least one software application configured to generate the fishbone map, analyze the attributes of plurality of streets that intersect the plurality of limited access highways within the fishbone map to determine the limited access highway entrance points, process the limited access highway entrance points, and store the limited highway entrance points in the geographic information database; and at least one server configured to run the at least one software application.

6. The method according to claim 1, wherein storing an identification corresponding to the limited access highway entrance points in the geographic information system further comprises applying a second set of attributes to the limited highways access entrance points.

7. The method according to claim 1, further comprising searching a requested limited access highway entrance point using the second set of attributes.

8. The method according to claim 7, wherein the second set of attributes is selected from the group consisting of alternate street names, county, zip code, city, state and province.

9. The method according to claim 1, wherein the first set of attributes is selected from the group consisting of Street Type, Controlled Access Indicator, Ramp Indicator, and Relative Elevation.

10. A system for determining the geographic locations of limited access highway entrance points for a geographic information system, the system comprising:
    at least one application generating a fishbone map that contains intersection points between a plurality of street segments with a plurality of limited access highways; identifying intersections on the fishbone map between the plurality of street segments and the plurality of limited access highways, the identified intersections including intersections that do not provide access via one of the plurality of street segments to the plurality of limited access highways; identifying limited access highway entrance points by analyzing a first set of attributes of the plurality of street segments and the plurality of limited access highways at the identified intersections within the fishbone map to determine the limited access highway entrance points; and providing directions to a telematics user for a requested limited access highway entrance point;
    at least one server implementing the at least one application; and
    at least one geographic information database for storing the geographic locations of the plurality of limited highway entrance points.

11. The system according to claim 10, further comprising a telematics unit for sending to a telematics service provider over a wireless communication network a request for directions to the requested limited access highway entrance point.

12. The system according to claim 10, wherein the at least one application stores the limited highway access entrance points in the geographic information database.

13. The system according to claim 10, wherein the at least one application processes the limited access highway entrance points to store them in the geographic information database as part of the geographic information system by applying a second set of attributes to the limited highways access entrance points.

14. The system according to claim 13, wherein the second set of attributes is selected from the group consisting of alternate street names, county, zip code, city, state and province.

15. The system according to claim 10, wherein the at least one application searches a requested limited access highway entrance point using the second set of attributes.

16. The system according to claim 10, wherein the first set of attributes is selected from the group consisting of Street Type, Controlled Access Indicator, Ramp Indicator, and Relative Elevation.

17. The system according to claim 10, wherein the directions provided to the telematics user include one of verbal directions, turn-by-turn directions, and autonomous navigation unit directions.

18. A non-transitory computer-readable medium having thereon computer-executable instructions for determining, the geographic locations of limited access highway entrance points for a geographic information system, the computer-readable instructions comprising:
   instructions for generating a fishbone map that contains intersection points between a plurality of street segments with a plurality of limited access highways;
   instructions for identifying intersections between the plurality of street segments and the plurality of limited access highways on the fishbone map, the identified intersections including intersections that do not provide access via one of the plurality of street segments to the plurality of limited access highways;
   instructions for identifying limited access highway entrance points by analyzing a first set of attributes of the plurality of street segments and the plurality of limited access highways at the identified intersections within the fishbone map to determine the geographic locations of the limited access highway entrance points; and
   instructions for storing an identification corresponding to the geographic location of a limited access highway entrance point in the geographic information system.

19. The non-transitory computer-readable medium according to claim 18, the instructions further comprising:
   instructions for receiving a request from a telematics user for directions to the limited access highway entrance point across a wireless communication network; and
   instructions for providing directions to the limited access highway entrance point across the wireless communication network to the telematics user.

* * * * *